United States Patent
Himmel, IV et al.

(10) Patent No.: US 9,637,034 B2
(45) Date of Patent: May 2, 2017

(54) FOAM CORD FOR SEATING FOAM STABILITY AND RIGIDITY

(71) Applicant: Ford Global Technologies, LLC, Dearborn, MI (US)

(72) Inventors: Joseph August Himmel, IV, Livonia, MI (US); Michael A. Hulway, Grosse Pointe Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 303 days.

(21) Appl. No.: 14/467,148

(22) Filed: Aug. 25, 2014

(65) Prior Publication Data

US 2016/0052434 A1   Feb. 25, 2016

(51) Int. Cl.
| | |
|---|---|
| *A47C 7/18* | (2006.01) |
| *B60N 2/70* | (2006.01) |
| *B60N 2/64* | (2006.01) |
| *B60N 2/68* | (2006.01) |
| *B29C 39/10* | (2006.01) |
| *B29C 44/04* | (2006.01) |
| *B29C 44/08* | (2006.01) |
| *A47C 7/02* | (2006.01) |
| *B29K 75/00* | (2006.01) |
| *B29K 105/12* | (2006.01) |

(52) U.S. Cl.
CPC ............. *B60N 2/646* (2013.01); *B29C 39/10* (2013.01); *B29C 44/0461* (2013.01); *B29C 44/086* (2013.01); *B60N 2/64* (2013.01); *B60N 2/68* (2013.01); *B60N 2/7017* (2013.01); *A47C 7/022* (2013.01); *A47C 7/18* (2013.01); *B29K 2075/00* (2013.01); *B29K 2105/12* (2013.01); *B60N 2/70* (2013.01)

(58) Field of Classification Search
CPC .............. A47C 7/022; A47C 7/18; B60N 2/70
USPC ...... 297/284.9, 284.6, 284.3, 452.27, 452.37, 297/452.65, 452.52, 452.53, 452.54, 297/452.18
See application file for complete search history.

(56) References Cited

U.S. PATENT DOCUMENTS

| | | | |
|---|---|---|---|
| 6,027,171 A * | 2/2000 | Partington | ........... B60N 2/0232 297/284.1 |
| 6,755,475 B1 * | 6/2004 | Tiesler | ..................... A47C 7/18 297/452.26 |
| 7,083,234 B2 * | 8/2006 | Dowty | ..................... B60N 2/62 297/230.14 |
| 7,946,649 B2 | 5/2011 | Galbreath et al. | |
| 8,434,826 B2 | 5/2013 | Zynda et al. | |
| 8,528,981 B2 | 9/2013 | Funk et al. | |

(Continued)

*Primary Examiner* — Syed A Islam
(74) *Attorney, Agent, or Firm* — Vichit Chea; Price Heneveld LLP

(57) ABSTRACT

A vehicle seating assembly includes a seatback having a frame that provides structural integrity to the seatback and operably couples the seatback to a vehicle floor. A carrier is operably coupled to the frame. A foam cushion assembly is operably coupled to the carrier. The foam cushion assembly includes an upper portion, a lower portion, a first side bolster, and a second side bolster. A continuous semi-rigid foam cord is formed in the foam cushion assembly. The foam cord extends through a forward periphery of the upper portion, the lower portion, the first side bolster, and the second side bolster. The foam cord is configured to add structural rigidity to the seatback.

17 Claims, 5 Drawing Sheets

(56) References Cited

U.S. PATENT DOCUMENTS

| | | | |
|---|---|---|---|
| 2007/0152491 A1* | 7/2007 | Ebe | B60N 2/643 297/452.27 |
| 2009/0284059 A1* | 11/2009 | Gupta | B60N 2/0224 297/284.9 |
| 2011/0006581 A1 | 1/2011 | Funk et al. | |

* cited by examiner

FOAM CORD FOR SEATING FOAM STABILITY AND RIGIDITY

FIELD OF THE DISCLOSURE

The present disclosure generally relates to a vehicle seating assembly, and more particularly to a vehicle seating assembly with a foam cord for seating foam stability and rigidity.

BACKGROUND OF THE DISCLOSURE

Vehicle seating assemblies typically include a seatback to support a back of an occupant in an upright sitting position and various reclined positions. Similar to other portions of a vehicle seating assembly, seatbacks are commonly designed to support an occupant in the upright sitting position upon acceleration, change in direction, and collision of the vehicle. Accordingly, seatbacks are substantially rigid and sizeable in construction.

SUMMARY OF THE DISCLOSURE

According to one aspect of the present disclosure, a vehicle seating assembly includes a seatback having a frame that provides structural integrity to the seatback and operably couples the seatback to a vehicle floor. A carrier is operably coupled to the frame. A foam cushion assembly is operably coupled to the carrier. The foam cushion assembly includes an upper portion, a lower portion, a first side bolster, and a second side bolster. A continuous semi-rigid foam cord is formed in the foam cushion assembly. The foam cord extends through a forward periphery of the upper portion, the lower portion, the first side bolster, and the second side bolster. The foam cord is configured to add structural rigidity to the seatback.

According to another aspect of the present disclosure, a vehicle seating assembly includes a seatback having a frame that provides structural integrity to the seatback and operably couples the seatback to a vehicle floor. A carrier is operably coupled to the frame. A foam cushion assembly is operably coupled to the carrier. A semi-rigid foam cord is formed in the foam cushion assembly and circumscribes the periphery of the seatback to add additional structural rigidity to the seatback.

According to yet another aspect of the present disclosure, a method of making a vehicle seating assembly includes coupling a seat frame and a seatback with a vehicle floor. A foam cushion assembly is operably coupled to the seat frame and seatback. A semi-rigid foam cord is formed into the seatback that circumscribes a forward periphery of the seatback to provide structural rigidity to the seatback.

According to still another aspect of the present disclosure, a vehicle seating assembly includes a seatback having a frame that supports a seatback having a foam cushion inside a vehicle. The foam cushion is supported by a carrier operably coupled to the frame. The foam cushion assembly includes a continuous semi-rigid foam cord formed into the foam cushion assembly. The foam cord extends through a forward periphery of the seatback and aids in providing structural support to a periphery of the seatback. The foam cord is constructed from one continuous piece of material having no seams or welds. The foam cord provides a softened feel to the posterior of and back of a seated passenger. The foam cord lessens or eliminates the abrupt and oftentimes rigid feel of traditional metallic wires used to support passengers.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
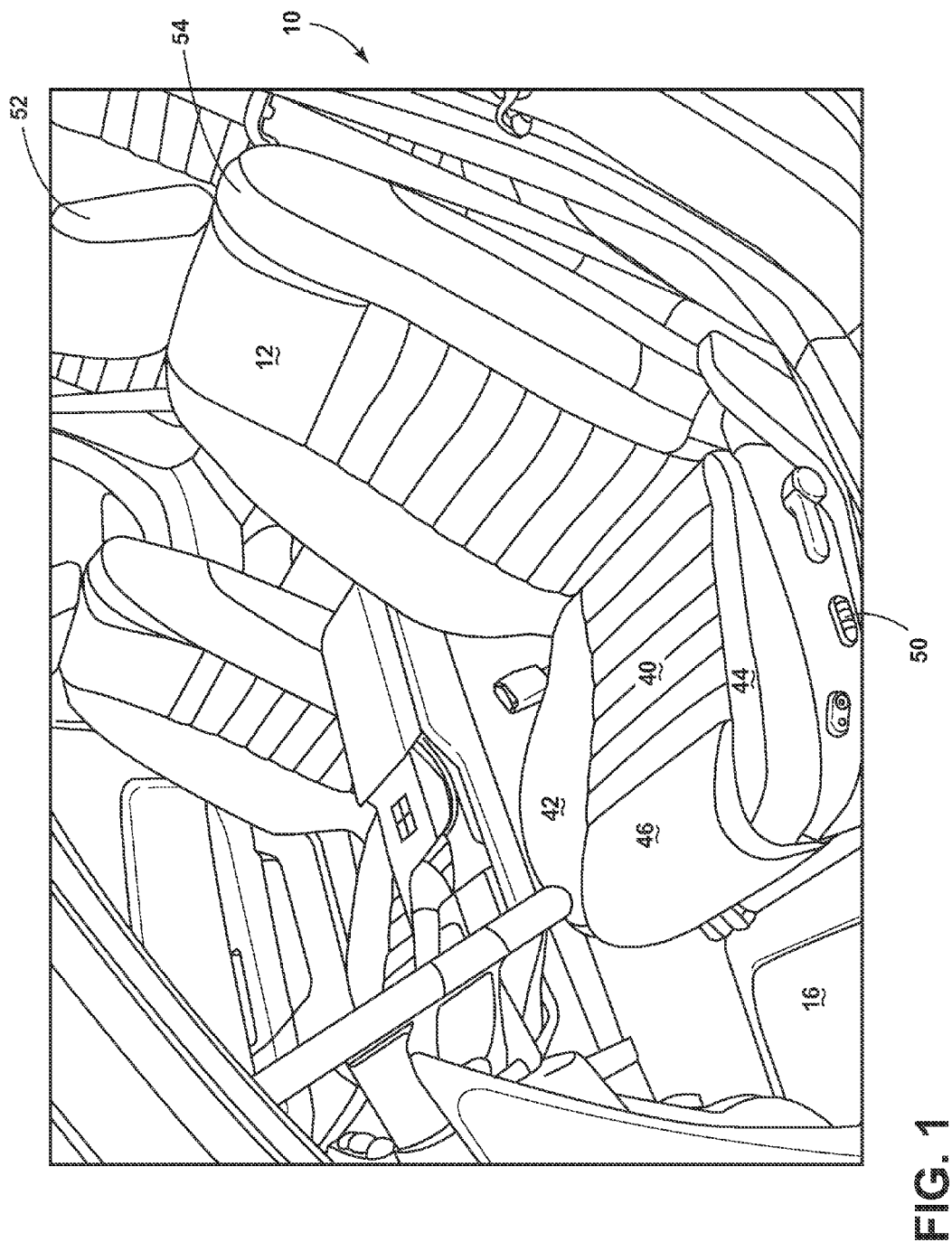
FIG. 1 is a top perspective view of one embodiment of a vehicle interior having a vehicle seating assembly including one embodiment of the present invention.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-4, reference numeral 10 generally designates a vehicle seating assembly including a seatback 12 having a frame 14 that provides structural integrity to the seatback 12 and operably couples the seatback 12 to a vehicle floor 16. A carrier 18 is operably coupled to the frame 14. A foam cushion assembly 20 is operably coupled to the carrier 18. The foam cushion assembly 20 includes an upper portion 22, a lower portion 24, a first side bolster 26, and a second side bolster 28. A semi-rigid foam cord 30 is formed into a continuous loop in the foam cushion assembly 20. The foam cord 30 extends through a forward periphery 32 of the upper portion 22, the lower portion 24, the first side bolster 26, and the second side bolster 28 of the foam cushion assembly 20. The foam cord 30 is configured to add structural rigidity to the seatback 12.

With reference again to FIG. 1, the foam cord 30 is generally configured for use in either the seatback 12 or a seat of the vehicle seating assembly 10. The vehicle seating assembly 10 includes a seat 40 having first and second side bolsters 42, 44, as well as a forward thigh support 46 configured to support the underside of the legs of a passenger. Controls 50, such as those shown on the side of the seat 40, can be used to adjust a recline angle of the seatback 12, as well as adjust lumbar support functions, seat heating/cooling systems, etc. The vehicle seating assembly 10 also includes a head restraint 52 disposed at a top portion 54 of the seatback 12.

Figure 2:
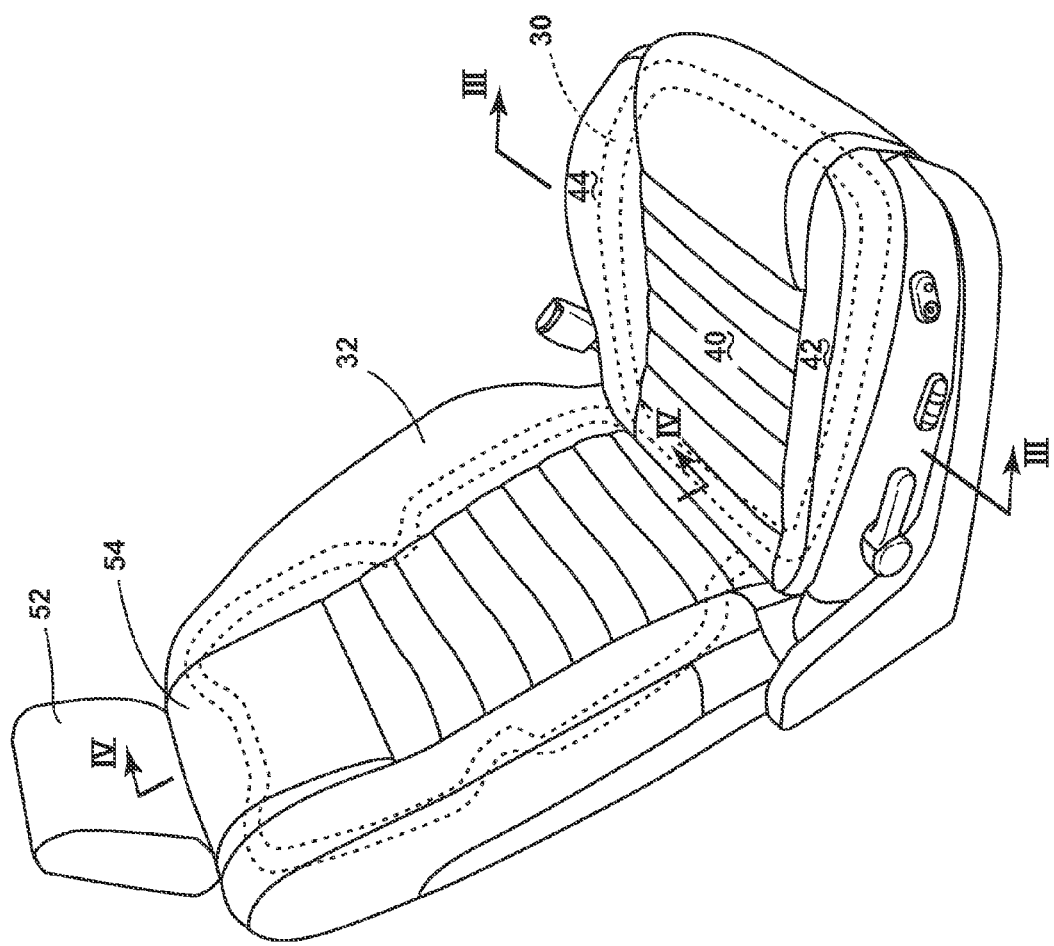
FIG. 2 is a top perspective view of one embodiment of a vehicle seating assembly with a foam cord shown in phantom.
Figure 2A:
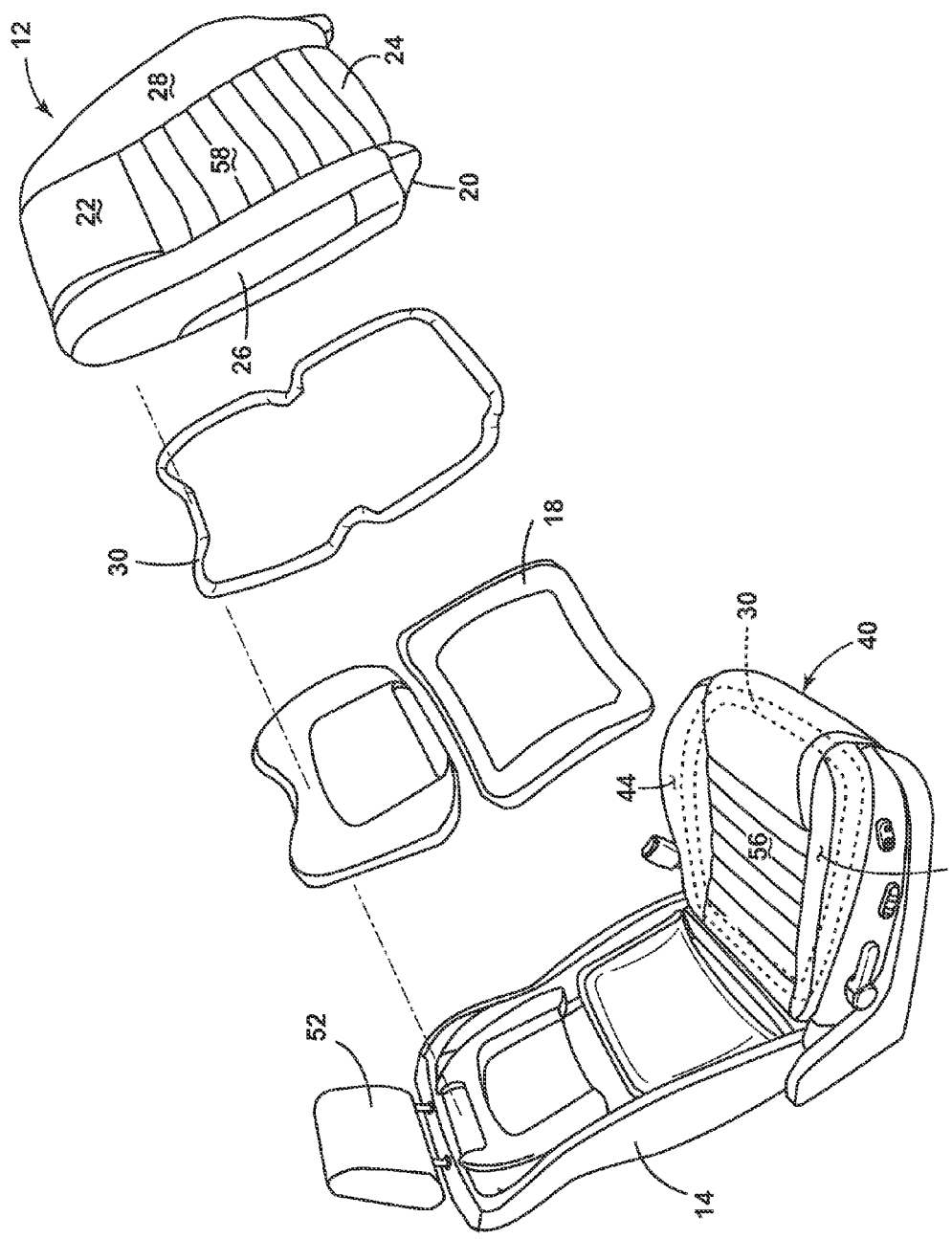
FIG. 2A is a top perspective partial exploded view of the vehicle seating assembly of FIG. 2.

With reference now to FIGS. 2 and 2A, in the illustrated embodiment, both the seatback 12 and a seat 40 of the vehicle seating assembly 10 include the foam cord 30. The foam cord 30 is semi-rigid in nature and generally constructed from any of a variety of polymeric materials. In one embodiment, the foam cord 30 is constructed from a polyurethane foam. Traditional seating assemblies for vehicles have used steel wires instead of a polymeric cord. Steel wires add additional weight and cost and can create hard spots in the periphery of the seat 40 and the seatback 12 that may be uncomfortable to passengers. Adding the foam cord 30 utilizing a dual firmness foam manufacturing process provides an affordable lightweight solution to using steel wires. During the dual firmness foam manufacturing process, dual shot injection mold ports can be used to apply foam to a first mold cavity, the first mold cavity being formed from a first mold half and a second mold half. A soft foam can be poured into the first mold cavity and allowed to cure. The first and second mold halves are subsequently separated and the first mold half is positioned proximate a third mold half having a shape defining a cavity in conjunction with the soft foam, which forms the foam cord 30. The material that makes up the foam cord 30 can then be poured into the cavity, creating a dual foam system with a semi-rigid ring defined by the foam cord 30. The foam cord 30 is positioned forward in the upper portion 22, the lower portion 24, the first side bolster 26, and the second side bolster 28 to provide strength and rigidity to the seat 40. Thus, a firmer foam is poured along a perimeter of a part to add desired rigidity, provides for a desirable and comfortable seat without losing the structural integrity of the vehicle seating assembly 10 as a whole. During the manufacturing process, special care is taken to ensure that the more rigid foam that defines the foam cord 30 does not bleed through or otherwise seep into the softer foam that defines a seat cushion 56 or a seatback cushion 58 of the seat 40 or the seatback 12, respectively. Accordingly, the feel of a harder area on the seat cushion 56 or the seatback cushion 58 can be eliminated. The foam cushion in many conventional seats is assembled directly on the seat frame without a carrier or other support in between. It is contemplated that the foam cushion or other support in between may be assembled with the foam cord, on the seat frame, the cushion, and the seatback without a carrier.

The foam cord 30, which is formed as a single continuous ring, can be placed into the mold halves of a forming tool in lieu of a wire. The foam cord 30 includes a higher density and firmness than the softer foam that is poured around the foam cord 30 and which defines the seat and seatback cushions 56, 58. When the foam cures, the foam cord 30, which is embedded in the foam cushion assembly 20, is disposed throughout the part on a forward area of the seat cushion 56 or the seatback cushion 58 and the desired structural rigidity is provided. As noted above, the foam cords 30 can be tooled from conventional polyurethane foam, as well as a multitude of other foams that include a tensile strength that satisfies structural rigidity concerns, while still being flexible enough to eliminate rigidity issues associated with wire rings.

In one embodiment, shape memory polymer fibers are embedded into the foam cord 30 itself. The shape memory polymer fibers that are utilized generally react to heat, moisture, electrical input, etc. The shape memory polymer fibers are in a resting or contracted state after the foam cord 30 is manufactured and cooled. When the hot foam that defines the seat or seatback cushion assembly is poured around the foam cord 30, the shape memory polymer fibers in the foam cord 30 are activated and expand. As the part cools, the shape memory polymer fibers in the foam cord 30 contract and slightly compress the soft foam part around the foam cord 30, thereby providing the desired structural rigidity. This solution eliminates the cost and weight of previously used steel wire rings, and minimizes the impact to comfort that a steel wire ring can have on a seated passenger.

The foam cord 30 is generally designed to include a higher density than the foam cushion assembly 20. Accordingly, the foam cushion assembly 20 can be utilized without the use of any support wires embedded therein. Further, the foam cord 30 may be generally homogeneous in material or may include a variety of different polymeric foam materials that have a higher standard integrity than the surrounding soft foam and which act in concert to support the periphery of the seatback 12 and/or the seat 40. The foam cord 30 is generally circular in cross-section. However, alternate cross-section styles, for example, oval, triangular, square, etc., can also be utilized to obtain a desired effect. Additionally, the foam cord 30 generally protrudes forward at the first and second side bolsters 26, 28 to support the first and second side bolsters 26, 28 in a forward position relative to the upper portion 22 and the lower portion 24 of the seatback 12. Further, as noted above, the foam cord 30 is formed in a continuous pour. Accordingly, the foam cord 30 does not include any breaks, weld lines, adhesion lines, etc. The absence of such breaks provides for a uniformly strong support in the seat 40 or the seatback 12.

Figure 3:
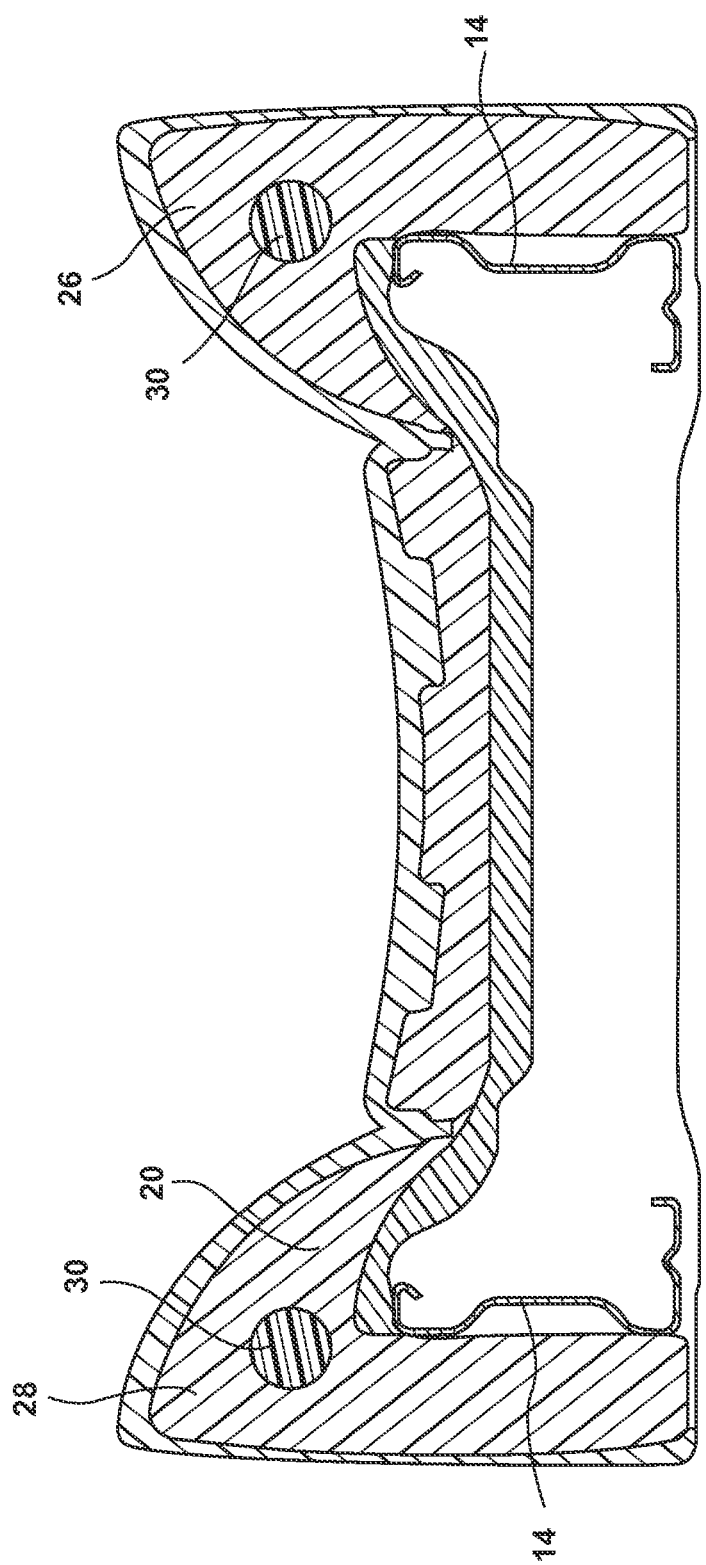
FIG. 3 is a top cross-sectional plan view of a vehicle seatback having one embodiment of a foam cord disposed therein.
Figure 4:
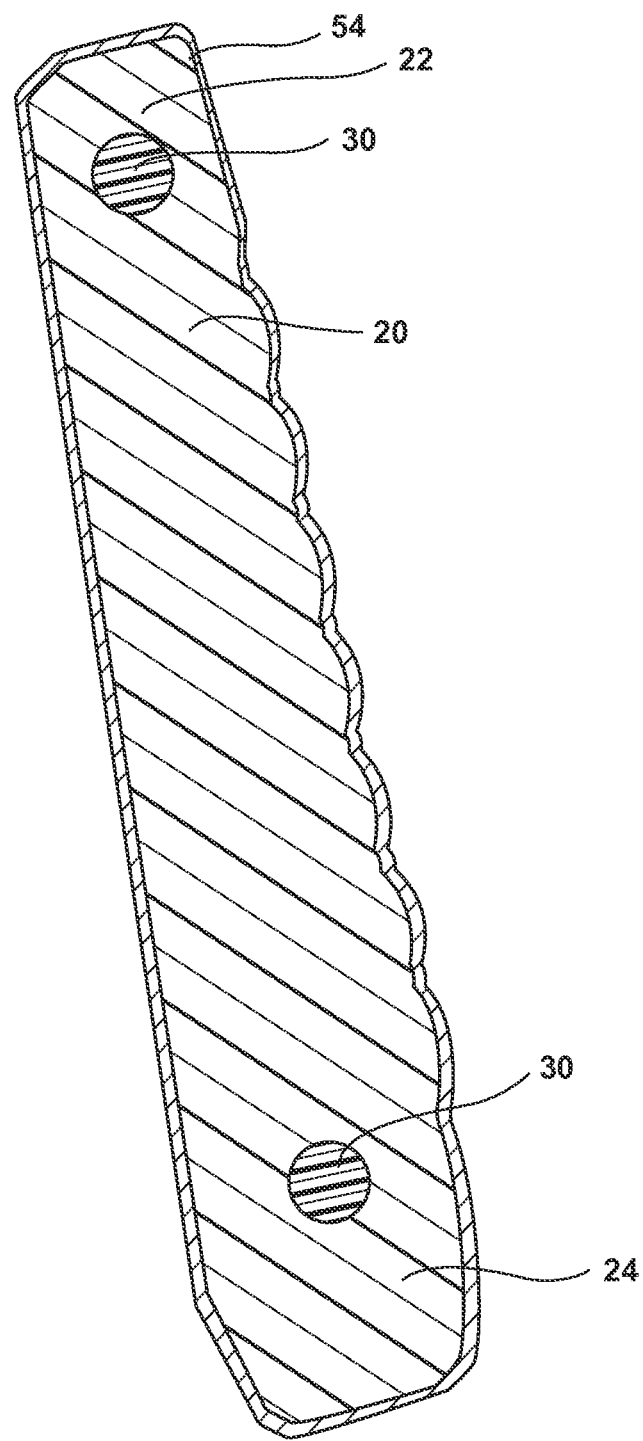
FIG. 4 is a side cross-sectional elevational view of a vehicle seatback having one embodiment of a foam cord disposed therein.

With reference now to FIGS. 3 and 4, the foam cord 30 is generally illustrated as protruding down along the first and second side bolsters 26, 28 forward of the upper portion 22 and the lower portion 24 of the central area of the seatback 12. Accordingly, a force or rate applied to one of the first and second side bolsters 26, 28 will result in tension in the foam cord 30, which helps support the first and second side bolsters 26, 28 in position as the force or weight of a passenger is applied to the first and second side bolsters 26, 28. Likewise, as illustrated in FIG. 4, the foam cord 30 extends through the upper portion 22 and the lower portion 24 of the seatback 12. The foam cord 30 extends through the upper portion 22 of the seatback 12 below the head restraint 52, and below a lumbar region of the lower portion 24 of the seatback 12.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle seating assembly comprising:
    a seatback including a frame that provides structural integrity to the seatback and which operably couples the seatback to a vehicle floor;
    a carrier operably coupled to the frame;
    a foam cushion assembly operably coupled to the carrier, the foam cushion assembly including an upper portion, a lower portion, a first side bolster, and a second side bolster; and
    a continuous semi-rigid foam cord formed in the foam cushion assembly, the foam cord extending through a forward periphery of the upper portion, the lower portion, the first side bolster, and the second side bolster, the foam cord being configured to add structural rigidity to the seatback.

2. The vehicle seating assembly of claim 1, wherein the foam cord has a higher density than the foam cushion assembly.

3. The vehicle seating assembly of claim 1, wherein the foam cushion assembly is free of support wires.

4. The vehicle seating assembly of claim 1, wherein the foam cord is circular in cross-section.

5. The vehicle seating assembly of claim 1, wherein the foam cord is formed from a shape memory polymer.

6. A vehicle seating assembly comprising:
    a seatback including a frame that operably couples the seatback to a vehicle floor;
    a carrier operably coupled to the frame;
    a foam cushion assembly operably coupled to the carrier; and
    a continuous semi-rigid foam cord formed in the foam cushion assembly and which circumscribes a forward periphery of the seatback, a tensile strength of the foam cord providing structural rigidity to the forward periphery.

7. The vehicle seating assembly of claim 6, wherein the foam cord protrudes forward at bolsters.

8. The vehicle seating assembly of claim 6, wherein the foam cord has a higher density than the foam cushion assembly.

9. The vehicle seating assembly of claim 6, wherein the foam cushion assembly is free of support wires.

10. The vehicle seating assembly of claim 6, wherein the foam cord is circular in cross-section.

11. The vehicle seating assembly of claim 6, wherein the foam cord is formed from a shape memory polymer.

12. A method of making a vehicle seating assembly comprising:
    coupling a seat frame and a seatback with a vehicle floor;
    coupling a foam cushion assembly to the seat frame and seatback; and
    forming a semi-rigid foam cord into the seatback that circumscribes continuously through a forward periphery of upper and lower portions and first and second side bolsters of the seatback to provide structural rigidity to and maintain a shape of the seatback.

13. The method of claim 12, further comprising:
positioning the foam cord to protrude forward at the first and second side bolsters formed in the seatback.

14. The method of claim 12, further comprising:
constructing the foam cord to have a higher density than the foam cushion assembly.

15. The method of claim 12, further comprising:
constructing the foam cushion assembly to be free of support wires.

16. The method of claim 12, further comprising:
constructing the foam cord to be circular in cross-section.

17. The method of claim 12, further comprising:
forming the foam cord from a shape memory polymer.

* * * * *